Oct. 21, 1952  W. A. WELDEN  2,614,726
PRESSURE COOKER
Filed Feb. 19, 1947
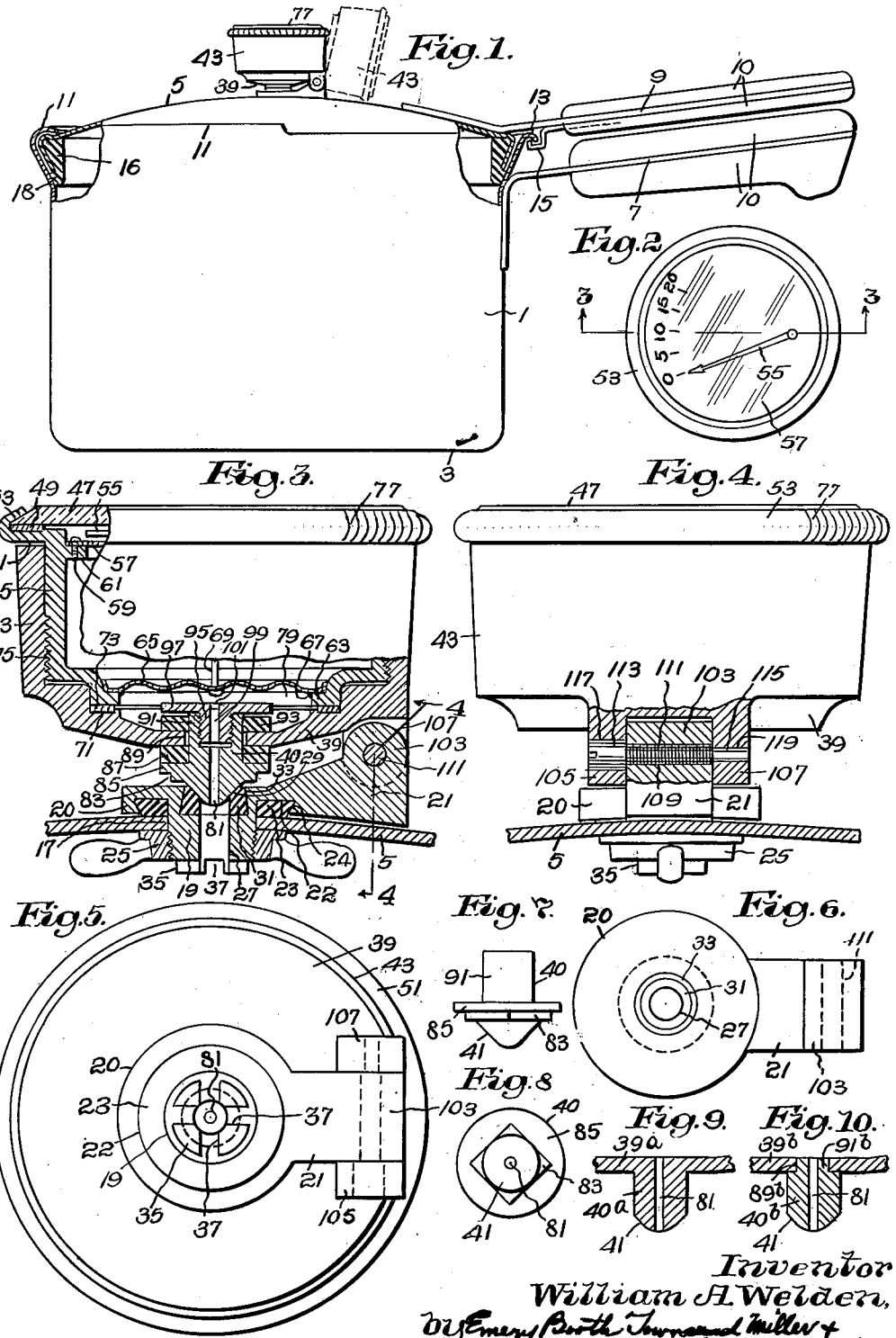
Inventor
William A. Welden,
D. J. Emery, Booth, Townsend, Miller & Weidner Attys Patented Oct. 21, 1952

2,614,726

UNITED STATES PATENT OFFICE 2,614,726

PRESSURE COOKER

William A. Welden, Stamford, Conn., assignor to Revere Copper and Brass Incorporated, Rome, N. Y., a corporation of Maryland Application February 19, 1947, Serial No. 729,443

2 Claims. (Cl. 220—44)

My invention relates to pressure cookers.

The invention, which has among its objects the provision of a pressure cooker having an improved pressure relief valve and an improved combined pressure relief valve and pressure indicating gauge, will be best understood from the following description of several specific embodiments of the invention selected for illustrative purposes, while the scope of the invention will be more particularly pointed out in the appended claims.

In the drawings:

Fig. 1 is a side elevation of a pressure cooker according to the invention, with parts in section;

Fig. 2 is a plan view, on an enlarged scale, of the combined pressure relief weight valve and pressure indicating gauge according to Fig. 1;

Fig. 3 is a side elevation, on an enlarged scale, with parts in section, of the combined pressure relief weight valve and pressure indicating gauge, and a fragment of the cover, according to Figs. 1 and 2, corresponding to a section on the line 3—3 of Fig. 2;

Fig. 4 is a side elevation of the parts shown by Fig. 3, with parts in section on the line 4—4 of the latter;

Fig. 5 is a bottom view of the assembly shown by Fig. 3, with parts omitted;

Fig. 6 is a plan of the valve seat member according to Figs. 3, 4 and 5;

Fig. 7 is an elevation of the valve part according to Fig. 3;

Fig. 8 is a bottom end view of the valve part according to Fig. 3; and

Figs. 9 and 10 are, respectively, fragmentary sections corresponding to Fig. 3, showing different modified forms of the valve part.

Referring to the drawings, the pressure cooker illustrated, except for the combined weight valve and gauge, is identical with one illustrated and described in applicant's copending application Serial Number 695,128, filed September 6, 1946, and therefore need not be described with any more particularity than necessary to describe the present invention.

The pressure cooker comprises a metallic container 1 having a closed bottom 3 and an open top, in which top is adapted to be removably received a metallic cover 5. Carried by the container is a laterally extending metallic handle extension 7, and carried by the cover is a laterally extending metallic handle extension 9, each extension being provided with handle grips 10. The cover is removably secured to the container by an inwardly turned lip 11 at one side of the container brim, and by an outwardly and downwardly turned lip 13 at the opposite side of the container brim, the lip 13 for this purpose cooperating with a hook 15 rigidly carried by the handle extension 9, while the joint between the cover and container is packed by a yieldable gasket 16 carried by the cover. The lip 11 extends through approximately 180 degrees of the angular extent of the container brim, while the lip 13 and hook 15 are relatively narrow, being approximately the width of the handle extension 9. The cover is secured to the container by inserting its edge under the lip 11 with the two handle extensions out of alignment, and then rotating the cover relative to the container to cause the hook 15 to move into operative relation with the lip 13, under which conditions the two handle extensions will be in alignment. The construction described is identical with that described in the above mentioned copending application.

As illustrated, the pressure cooker cover adjacent its center portion is formed with a cylindrical opening 17. Resting on the upper portion of the cover is a valve seat member comprising a cylindrical shank 19 having at its upper end a head 20 formed with a lateral extension 21. The shank extends through the opening 17 of the cover from the upper side thereof, while the head 20 on its under side is formed with an annular recess 22 surrounding the shank, this recess receiving an annular flat gasket washer 23, of yieldable material such as rubber, resting on the top of the cover. As shown, the side walls of the recess are upwardly and outwardly beveled, as indicated at 24, or are otherwise undercut, for removably retaining the washer in the recess. A wing nut 25 screw-threaded on the lower end of the shank 19 serves to clamp the valve seat member to the cover, the gasket washer 23 rendering steam tight the joint between the two latter.

As shown, the shank 19 of the valve seat member is provided with an axial through passage 27 of circular cross-section opening on the upper side of that member, which passage serves as a vent for the cooker. The upper end of this passage is countersunk to form an upwardly and laterally facing internal frusto-conical valve seat 29. If desired, the portion of the valve seat member on which the valve seat is formed may consist of a sleeve 31, of rubber or other yieldable material, inserted in and tightly fitting an enlarged diameter portion 33 of the passage 27 at its upper end. As shown, the side walls of this enlarged portion of the passage are upwardly and inwardly tapered so as to insure against blowing out of the sleeve 31 by the steam pressure after the sleeve is sprung into said portion. Preferably the shank 19 has a reduced diameter extension 35 at its lower end provided with cross slots 37 for the purpose of insuring against clogging of the vent passage by leaf-like vegetables or the like in the cooker.

For controlling relief of pressure fluid from the container through the vent passage 27 is provided a vertically movable weight valve, this weight valve including a pressure gauge for indicating the pressure within the cooker. As shown, the weight valve comprises an outer casing having a bottom wall 39 carrying a valve part 40 having the frusto-conical end 41 adapted to seat on the valve seat 29. This outer casing also comprises an upwardly extending annular wall 43 integral with the bottom wall 39.

The pressure gauge comprises an annular casing 45 closed at its upper end by a crystal 47. As shown, the crystal rests on a yieldable gasket ring 49 carried by a radially outwardly projecting flange 51 at the upper end of the casing 45, the outer extremity of this flange being of reduced thickness and turned over, as indicated at 53, to secure the crystal against removal and to hold it in fluid tight contact with the gasket ring 49. Beneath the crystal is a swinging indicator hand 55 moved by the gauge mechanism, this hand cooperating with a graduated dial 57 secured by screws 59 to supporting lugs 61 formed integrally with the casing 45. At its lower end the casing 45 is provided with an internal annular inwardly projecting flange 63 on which rests the peripheral portion of a flexible corregated disk-like metal diaphragm 65, the diaphragm being soldered to the flange, as indicated at 67, so that the bottom of the casing 45 is hermetically sealed. Secured to the center portion of the diaphragm is the end portion of a pin 69 for actuating the internal mechanism (not shown) of the gauge for operating the gauge indicator hand 55.

As shown, the outer casing of the weight valve adjacent the periphery of its bottom wall 39 is formed with an annular groove 71 which receives an annular yieldable gasket ring 73 on which the flange 63 of the gauge casing is adapted to rest when the gauge is placed within the outer casing through the opening presented at the upper portion of the annular wall 43. As shown, the annular wall 43 adjacent its bottom portion is formed with internal screw-threads and the gauge casing with exterior cooperating screw-threads, as indicated at 75, for securing the two together, the turned over portion 53 of the gauge casing conveniently being exteriorly knurled, as indicated at 77, so that the gauge may be readily turned to screw the bottom portion thereof firmly against the gasket ring 73. When the parts are in assembled relation a chamber 79 is formed between the diaphragm 65 and the bottom wall 39 of the outer casing. This chamber is placed in communication with the vent passage 27 of the valve seat member by a through passage 81 formed in the valve part 40, so that when the latter is seated on the valve seat 29 the gauge will indicate the pressure within the pressure cooker.

As shown in Figs. 3 and 7, the valve part 40 at the base of the frusto-conical portion 41 thereof is provided with an exteriorly squared portion 83 for engagement by a wrench or other suitable tool when assembling or disassembling the valve part with the outer casing of the combined weight valve and pressure indicator. Contiguous with this squared portion the valve part is formed with a relatively large diameter circular flange 85 between which and the under surface of the bottom wall 39 of the outer casing of the weight valve is positioned a washer 87 of yieldable material such as rubber. Extending through the washer 87 and a cylindrical opening 89 in the bottom wall 39 of the outer casing of the combined weight valve and pressure gauge is a cylindrical shank portion 91 of the valve part, this shank portion being of lesser diameter than that of the opening 89. Above the wall 39 and surrounding the shank portion 91 is a washer 93, of yieldable material such as rubber, this washer and the washer 87 both rather loosely fitting such shank portion so as to be slidable relative to it. Screw-threaded into the rearward end of the shank portion 91 is the shank 95 of a screw having a large diameter flattened head 97 which, when the valve is in the position of parts shown by Fig. 3, is in spaced relation to the washer 93. As shown, the screw is provided with an axial through passage 99 serving as part of the passage 81 of the valve part. At its upper side the screw is provided with a diametrical slot 101 for receiving a screw driver for turning the screw.

As shown, the extension 21 of the valve seat member at its end remote from the shank 19 is extended upwardly to form a lug 103, while the outer casing of the combined pressure relief valve and pressure indicating gauge is formed with a pair of spaced lugs 105 and 107 respectively lying at opposite sides of the lug 103 and bearing thereagainst. As shown, the lug 103 is provided with a screw-threaded perforation 109 through which is screw-threaded the screw-threaded shank portion 111 of a pin having at one end an elongated cylindrical head 113 and at its opposite end a cylindrical extension 115, the head 113 being received in a perforation 117 in the lug 105, and the extension 115 being received in a perforation 119 in the lug 107. In this way the pin serves pivotally to support the combined weight valve and pressure indicating gauge for swinging movement in a vertical plane.

It requires considerable nicety in manufacture to insure that the frusto-conical portion 41 of the valve part 40 carried by the pivotally mounted weight will properly seat on the valve seat if the valve part is rigidly attached thereto. According to the present construction, however, the clearance between the walls of the opening 89 in the bottom wall 39 of the outer casing of the weight and the shank 91 of the valve part 40 permits the latter to move laterally relative to such casing so that the valve will properly seat despite inaccuracies of manufacture and warping and wear of parts. Further, the washer 87, being of yieldable material, will permit requisite tilting of the valve part when necessary to secure this same result. However, having the valve part rigidly carried by the bottom wall of the weight is not precluded when a less expensive construction is desired or the facilities of the manufacturer in respect to securing extreme accuracy permit. For example, as shown by Fig. 9, the valve part 40$^a$ may be formed integrally with the bottom wall 39$^a$ of the outer casing of the combined weight and pressure gauge, or, as shown by Fig. 10, the valve part 40$^b$ may be formed with a shank 91$^b$ driven into the opening 89$^b$ of the casing bottom wall 39$^b$.

With the construction above described, by removing the wing nut 25 the valve seat member with the attached combined weight valve and pressure gauge may be readily removed from the cover and stored separately from the latter when the cooker is not in use. Also such removal permits the cover to be washed or otherwise cleaned without subjecting the gauge to possibility of damage by the washing operation, and further permits ready replacement and repair of the gauge. When the valve seat member and gauge are so removed the gasket washer 23, although readily removable from the valve seat member, will remain attached to it, thus in effect reducing the number of parts detached from the cover to two, namely, the wing nut and the valve seat member and attached gauge and valve, and, in this way, minimizing the possibility of lost parts in storage. Still further, by reason of the shank 19 being rotatably received in the opening 17 of the pressure cooker cover, the gauge may be placed in any desired rotative position relative to the cover prior to tightening the wing nut. In this last connection it will be understood that when the cover is secured to the container the cover is always in substantially the same angular position relative to the container, namely, that determined by the vertical alignment of the two handle extensions. Normally, when the pressure cooker is the only vessel on the stove top, the most convenient position for the handle extensions is that which causes them to project toward the front of the stove, in which case the most convenient position for the gauge is that which will enable it to be read from the front of the stove. However, when other vessels are on the stove top at the same time as the pressure cooker, or more than one pressure cooker is on it, and particularly when the pressure cooker is placed behind another pressure cooker or other vessel, it is seldom convenient or even possible to have the handle extensions project toward the front of the stove, and in fact the same is true with the ordinary gas stove if the pressure cooker is placed over one of the rearward gas burners, even if the pressure cooker is the only vessel on the stove top, for if under such conditions the handle extensions projected toward the front of the stove they would overlie a gas burner toward the front of the stove and be subjected to overheating or burning of the handle grips if such gas burner is ignited. In these cases by adjusting the valve seat member into the proper rotative position relative to the cover, and clamping it thereto by means of the wing nut, the gauge can readily be read from the front of the stove with the handle extensions properly positioned to clear other vessels and the gas burners. In fact, positioning the gauge in any given rotative position relative to the cover acts to insure against the handle extensions projecting in an undesired direction because the operator will automatically turn the cooker to a position in which the gauge indicia face him.

In using the pressure cooker, food and water, or food of such nature that it will generate steam, are placed in the container and the cover secured thereto, after which the cooker is placed on the stove, whereupon the gauge is tilted by the operator into its dotted line position shown by Fig. 1 so as to open the valve, in which position the gauge will remain until manually moved to close the valve. Heating of the contents of the cooker vents it of air through the open vent passage 27. When the air is substantially completely removed, evidenced by the presence of a slight amount of steam escaping through the vent opening, the gauge will then be tilted by the operator into its position shown by Fig. 3 so as to close the valve. When the valve is thus closed the weight of the gauge and parts carrying it will firmly seat the valve on the valve seat 29 and will seal the joint between the valve and the outer casing wall 39 by reason of the latter being supported under these conditions on the yieldable gasket washer 87 carried by the valve, it being understood that the valve will move laterally and tilt relative to the casing, as above explained, to secure proper seating of it on the valve seat. Seating of the valve will cause pressure to build up in the cooker slightly to raise the cover to cause it to bear against the lip 11, and to cause the hook 15, operatively carried by the cover, to bear against the lower end of the downturned lip 13, all without causing the lower portion 18 of the gasket ring to move out of contact with the container, against which latter the steam pressure acts to press such portion 18.

When the cooker is under pressure, steam passing through the central bore of the valve into the chamber 79 will flex the diaphragm 65 upward to cause the indicator hand to indicate such pressure, which pressure may be readily held at any desired point by controlling the amount of heat applied to the cooker. When the pressure reaches a predetermined value, say fifteen pounds per square inch, determined by the effective area of the valve exposed to the vent passage 27 in the valve seat member, the downward pressure of the weight of the parts on the valve will be overcome and cause those parts to swing upward about their pivotal connection to the valve seat member to open the valve and vent the contents of the cooker, which venting of course may be done at any time by moving the valve into its dotted line position shown by Fig. 1. In the construction shown, as the opening 89 which receives the shank 91 of the valve part 40 is of a diameter greater than that of the vent passage 27 in the valve seat member, the unbalanced pressure in the chamber 79 beneath the diaphragm 65 will cause the outer casing and gauge to rise to take up the clearance between the washer 93 and the screw head 97, tightly to seat the latter on the former, before the pressure in the cooker builds up to the extent necessary to cause the valve part to be lifted from the valve seat 29. This, however, will not affect the seating of the valve part on the seat 29, because such unbalanced pressure acts to urge the valve toward that seat, it remaining seated after the above mentioned clearance is taken up until the pressure of the steam in the vent passage 27 exerts sufficient upward pressure on the valve and a portion of the diaphragm corresponding to the cross-sectional area of the passage 99 in the screw 95, 97 to overcome the weight of the parts tending to hold the valve on its seat. This clearance need be but very small, say in the order of one hundredth of an inch, so that this upward movement of the casing to seat the head of the screw on the gasket washer 93, and simultaneously move the under surface of the bottom wall 39 of the casing out of contact with the washer 87, occurs so rapidly that it does not result in any appreciable escape of steam from the chamber 79.

It will be understood that within the scope of the appended claims wide deviations may be made from the form of the invention described without departing from the spirit of the invention.

I claim:

1. A pressure vessel having a wall provided with a vent passage presenting an upwardly facing frusto-conical valve seat, a combined relief valve and pressure gauge for controlling said passage and indicating the pressure therein comprising a casing having a bottom wall facing said valve seat, which casing is pivotally carried by said vessel for swinging movement in a vertical plane, a part comprising a shank carrying at one end thereof a valve having a tapered surface adapted to seat on said valve seat, which part is formed with a bore for admitting pressure fluid from said vessel to said gauge when said valve is closed, said casing being formed with an opening for loosely receiving said shank for permitting lateral movement of said part and valve relative to said valve seat, said part being formed with an upwardly facing annular shoulder portion beneath said bottom wall of said casing, which portion carries an annular gasket for seating on said wall for rendering the joint between said part and casing fluid tight when said valve is seated.

2. A portable pressure cooker comprising a container, a cover for said container, said container and cover having radially extending handles, means for securing the cover to said container in steam tight relation thereto enforcing the handle for the cover to be in superimposed relation to the handle for the container and with said handles in closely spaced relation whereby the two handles when so positioned act as a single handle for the container and attached cover, said cover being formed with an upwardly facing opening the axis of which lies in a vertical plane that includes the longitudinal axis of the radially extending handle for the cover, a part having a screw-threaded shank rotatably extending through said opening, a vent passage extending through said shank and opening on the upper side of said part, a weight including a pressure indicator having a cooperating pointer and upwardly facing calibrated dial, a horizontal hinge for said weight, said part having an integral lateral extension, said hinge being carried by said lateral extension and rotatable with said shank to enable the positioning of the axis of the hinge transverse to the longitudinal axis of said cover handle and between said handle and vent passage, a downwardly facing valve for said vent passage carried by said weight, which valve is formed with a passage for admitting pressure fluid from the vent passage to said pressure indicator, and a nut on said shank beneath said cover for clamping said part to said cover in predetermined selected rotative positions relative thereto.

WILLIAM A. WELDEN.

REFERENCES CITED

The following references are of record in the file of this patent:

UNITED STATES PATENTS

| Number | Name | Date |
|---|---|---|
| 1,508,696 | Jacobs | Sept. 16, 1924 |
| 1,541,073 | Sohm | June 9, 1925 |
| 1,585,512 | Roades | May 18, 1926 |
| 1,638,032 | Himmelsbach | Aug. 9, 1927 |
| 1,823,595 | Ducroux | Sept. 15, 1931 |
| 2,200,903 | Stephens | May 14, 1940 |
| 2,297,378 | Wittenberg | Sept. 29, 1942 |
| 2,459,553 | Sullivan | Jan. 18, 1949 |
| 2,513,350 | Nelson | July 4, 1950 |